W. B. SCOTT.
COUPLING FOR PUMP RODS.
APPLICATION FILED OCT. 25, 1909.

971,794.

Patented Oct. 4, 1910.

Witnesses:

Inventor:
William B. Scott.

UNITED STATES PATENT OFFICE.

WILLIAM B. SCOTT, OF LOS ANGELES, CALIFORNIA.

COUPLING FOR PUMP-RODS.

971,794.  Specification of Letters Patent.  Patented Oct. 4, 1910.

Application filed October 25, 1909. Serial No. 524,564.

*To all whom it may concern:*

Be it known that I, WILLIAM B. SCOTT, a citizen of the United States, residing at Los Angeles, in the county of Los Angeles and State of California, have invented a new and useful Coupling for Pump-Rods, of which the following is a specification.

This invention relates to couplings designed for coupling together pump rods used in oil wells, but which may also be utilized for coupling other rods together, and one of the main objects of the present invention is to provide an improved means for securing the rod to the coupling whereby the end of the rod is reinforced and strengthened at its inner end or rim and prevented from spreading or splitting, and is also reinforced at the inner ends of the threads and prevented from bending or breaking at the inner end of the thread.

A further object is to provide a novel, efficient and economical means for preventing the rod from unscrewing from the coupling.

With these and other objects in view, the invention consists in the particular construction and combination of the parts, as hereinafter described.

Figure 1:
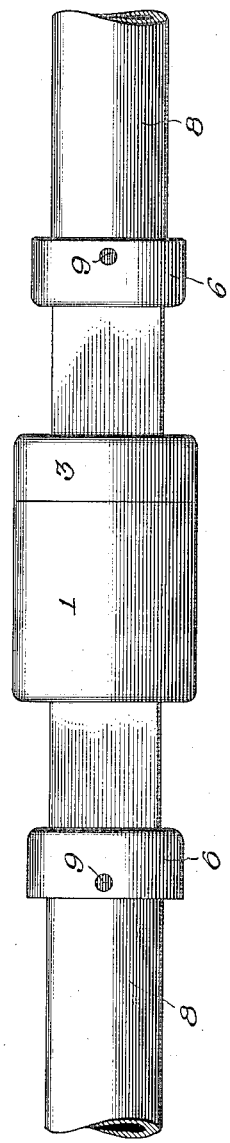
Figure 2:
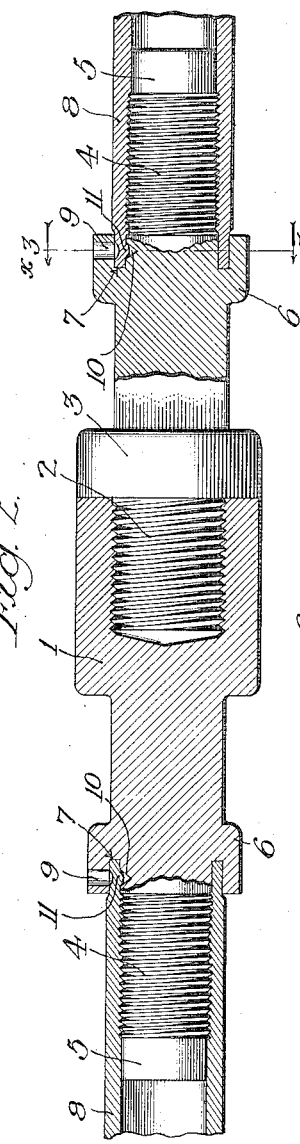
Figure 3:
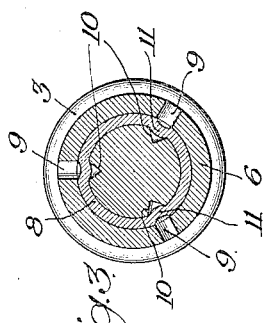

Referring to the drawings: Figure 1 is a side elevation of the coupling with the rods screwed thereto. Fig. 2 is a longitudinal section through the coupling and adjacent portions of the rod. Fig. 3 is a cross section on line $x^3$—$x^3$ Fig. 2.

The coupling comprises a female threaded member 1 and a male member 2 which is screwed thereto, the member 2 having a flange 3 which abuts against the end of the member 1. Each member of the coupling at its outer end has a pin 4 which is externally threaded for a portion of its length, the outermost portion 5 being unthreaded. Each member also has a flange 6 at an intermediate point at the termination of the threaded portion 4 and each flange 6 is formed with an annular groove 7 which receives the inner end of the pump rod 8 which closely fits therein and is screwed on the threads 4 which are preferably tapered, the blank portion 5 of the pin closely fitting the bore of the rod 8 and strengthening the rod at the outer threads, so that the outer thread does not carry the bending strain of the rod and thus the rod is prevented from bending or breaking at this point, which otherwise it is very apt to do. The flange 6 is also provided with a plurality of holes 9, preferably three in number and the inner wall of the groove 7 is provided with a corresponding number of shallow depressions 10 which may be formed by the cutting end of the drill in boring the holes 9. The wall of the rod 8 is indented as at 11 after the rod has been inserted in the annular groove 7, so that the indentations 11 project into the depressions 10, which indentation is performed by a suitable punch inserted through the holes 9. After the rod 8 has been indented in this manner it is securely locked to the depressions 10 and prevented from unscrewing. Should it be desired to remove the rod, it may be done by inserting a drill through the holes 9 and drilling through the indented wall of the rod which will then permit the rod to be withdrawn.

What I claim is:

1. A coupling for pump rods comprising two members, each of which has a threaded pin screwed into the pump rod, a flange on the member at the base of the pin, said flange having an annular groove which receives the end of the pump rod, the inner wall of the groove having depressions, the wall of the rod being indented to engage said depressions, the flange having holes for the insertion of a punch to produce said indentations.

2. A coupling for pump rods comprising two members, each of which has a threaded pin screwed into the pump rod, a flange on the member at the base of the pin, said flange having an annular groove which receives the end of the pump rod, the inner wall of the groove having depressions, the wall of the rod being indented to engage said depressions, the flange having holes for the insertion of a punch to produce said indentations, the end of the pin being blank and closely fitting the bore of the rod to relieve the threads from strain.

3. A member having an annular grooved flange and depressions with a threaded pin projecting beyond the flange, a rod screwed on the threaded pin with its end extending into the grooved flange, and provided with indentations in its wall engaging said depressions.

In testimony whereof, I have hereunto set my hand at Los Angeles, California, this 18th day of October, 1909.

W. B. SCOTT.

In presence of—
G. T. HACKLEY,
FRANK L. A. GRAHAM.